US009703547B2

(12) United States Patent
Dhoolia et al.

(10) Patent No.: US 9,703,547 B2
(45) Date of Patent: Jul. 11, 2017

(54) COMPUTING PROGRAM EQUIVALENCE BASED ON A HIERARCHY OF PROGRAM SEMANTICS AND RELATED CANONICAL REPRESENTATIONS

(71) Applicant: International Business Machines Corporation, Armonk, NY (US)

(72) Inventors: Pankaj Dhoolia, Bangalore (IN); Diptikalyan Saha, Bangalare (IN)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 14/222,911

(22) Filed: Mar. 24, 2014

(65) Prior Publication Data
US 2015/0268950 A1    Sep. 24, 2015

(51) Int. Cl.
*G06F 9/44*    (2006.01)
*G06F 17/30*    (2006.01)

(52) U.S. Cl.
CPC .................. *G06F 8/70* (2013.01); *G06F 8/36* (2013.01); *G06F 8/72* (2013.01); *G06F 17/30477* (2013.01)

(58) Field of Classification Search
None
See application file for complete search history.

(56) References Cited

U.S. PATENT DOCUMENTS 6,029,002 A *  2/2000  Afifi ........................ G06F 8/433
                                                                714/E11.209
7,117,487 B2  10/2006  Meredith et al.
8,528,004 B2   9/2013  Archer et al.
2004/0044994 A1*  3/2004  Bera .............................. 717/136
2004/0172612 A1*  9/2004  Kasravi ..................... G06F 8/36
                                                                717/101

(Continued)

OTHER PUBLICATIONS

Santanu et al. "A framework for source code search using program patterns." Jun. 1994, IEEE Transactions on Software Engineering 20.6 (1994): pp. 463-475.*

(Continued)

*Primary Examiner* — Chameli Das
*Assistant Examiner* — Joanne Macasiano
(74) *Attorney, Agent, or Firm* — Ryan, Mason & Lewis, LLP (57) ABSTRACT

Methods, systems, and articles of manufacture for computing program equivalence based on a hierarchy of program semantics and related canonical representations are provided herein. A method includes defining a program semantic representation for a first program; generating a search query based on said semantic representation for the first program; executing said search query against an index of multiple programs to determine a set of candidate programs among the multiple programs, wherein said index comprises a program semantic representation defined for each of the multiple programs; and identifying one or more programs among the set of candidate programs that match the first program by performing one or more comparisons, across the set of candidate programs, of a canonical representation associated with each program in the identified set of candidate programs to a canonical representation associated with the first program.

18 Claims, 7 Drawing Sheets

(56) References Cited

U.S. PATENT DOCUMENTS

| | | | |
|---|---|---|---|
| 2005/0028143 A1* | 2/2005 | Aridor | G06F 8/71 |
| | | | 717/122 |
| 2005/0154899 A1* | 7/2005 | Marvel | G06F 21/64 |
| | | | 713/187 |
| 2008/0052277 A1* | 2/2008 | Lee | 707/3 |
| 2011/0231824 A1 | 9/2011 | Chabbi et al. | |
| 2011/0246968 A1* | 10/2011 | Zhang et al. | 717/125 |
| 2011/0271265 A1* | 11/2011 | Drozdov | G06F 8/4452 |
| | | | 717/160 |
| 2012/0011084 A1 | 1/2012 | Gulwani et al. | |
| 2014/0108418 A1* | 4/2014 | Elbaum et al. | 707/741 |

OTHER PUBLICATIONS

Yao et al. "Towards a semantic-based approach for software reusable component classification and retrieval." Apr. 2004, Proceedings of the 42nd annual Southeast regional conference, ACM.*
Nomikos et al. Strong Equivalence of Logic Programs under the Infinite-Valued Semantics, Information Processing Letters 109: 576-581, 2009.

* cited by examiner

[Save] [Slice]

```
 1 *&---------------------------------------------------------------*
 2 *& Report  Z_TEST_EXRATE
 3 *&
 4 *&---------------------------------------------------------------*
 5 *&
 6 *&
 7 *&---------------------------------------------------------------*
 8
 9 report z_test_exrate.
10 *----------------------------------------------------------------
11 * SELECTION SCREEN
12 *----------------------------------------------------------------
13
14 select-options: s_budat for sy-datum.
15
16 *----------------------------------------------------------------
17 * CONSTANTS
18 *----------------------------------------------------------------
19 constants : c_icurr type waers value 'INR'.
20
21 *----------------------------------------------------------------
22 * TYPES
23 *----------------------------------------------------------------
24 types: begin of ty_itemrate.
25         include structure zitemrate.
26 types: dispamt type zitemrate-amount,
27        end of ty_itemrate.
28
29 *----------------------------------------------------------------
30 * DATA DECLARATION
31 *----------------------------------------------------------------
32 data: it_itemrate type standard table of ty_itemrate,
33       wa_itemrate type ty_itemrate.
34
35 data: v_exrate type ukurs_curr.
36
37 type-pools: slis.
38
39 data: it_fieldcat type slis_t_fieldcat_alv,
40       wa_fieldcat type slis_fieldcat_alv,
```

▶ Input: ← 102
    zitemrate [Table]
    READ_EXCHANGE_RATE [Function]
    c_icurr [Global]
    s_budat [User Input]
▶ Output: ← 104
    matnr [Write]
    dispamt [Write]
▶ Out <-- in [Mappings] ← 106
    matnr <-{zitemrate-matnr, s_budat}
    dispamt <-{zitemrate-(amount,exrate,waers), READ_EXCHANGE_RATE, s_budat, c_icurr}

COMPUTING PROGRAM EQUIVALENCE BASED ON A HIERARCHY OF PROGRAM SEMANTICS AND RELATED CANONICAL REPRESENTATIONS

FIELD OF THE INVENTION

Embodiments of the invention generally relate to information technology, and, more particularly, to analyzing program equivalence.

BACKGROUND

In a packaged applications scenario, custom code equivalency solutions (which to may, for example, have been written decades previously) can cause severe maintenance grief and hinder tasks such as system upgrades, harmonization, and consolidation. Accordingly, such solutions are disadvantageous. Alternative approaches include attempting to find similar standard package solutions that may have been since released by the packaged applications vendor. However, some existing alternative approaches only function within a context of significant textual similarity between the custom solution and the standard solution, which is uncommon in practice. Additionally, while other existing alternative approaches utilize the commonality of external entities used such as tables, functions, etc., such approaches suffer from false positive challenges and do not help in understanding semantic equivalence or differences.

Consequently, a need exists for techniques that determine program equivalence based on a hierarchy of light-weight and deep program semantics and related canonical representations.

SUMMARY

In one aspect of the present invention, techniques for computing program equivalence based on a hierarchy of program semantics and related canonical representations are provided. An exemplary computer-implemented method can include steps of defining a program semantic representation for a first program; generating a search query based on said semantic representation for the first program; executing said search query against an index of multiple programs to determine a set of candidate programs among the multiple programs, wherein said index comprises a program semantic representation defined for each of the multiple programs; and identifying one or more programs among the set of candidate programs that match the first program by performing one or more comparisons, across the set of candidate programs, of a canonical representation associated with each program in the identified set of candidate programs to a canonical representation associated with the first program.

In another aspect of the invention, an exemplary computer-implemented method can include steps of defining a program semantic abstraction for a first program; generating a search query based on said semantic abstraction for the first program; and executing said search query against an index of multiple programs to identify a pre-determined number of candidate equivalent programs from the index of multiple programs based on one or more metrics, wherein said index comprises a program semantics abstraction defined for each of the multiple programs. The method also includes steps of classifying one or more programs among the candidate equivalent programs as matching the first program by performing a comparison, across the candidate equivalent programs, of a canonical representation associated with each program in the candidate equivalent programs to a canonical representation associated with the first program; and outputting an identification of the one or more programs classified as matching.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 6 is a diagram illustrating visualization of an example workbench, in accordance with at least one embodiment of the present invention.

DETAILED DESCRIPTION

As described herein, an aspect of the present invention includes computing program equivalence based on a hierarchy of light-weight and deep program semantics and related canonical representations. At least one embodiment of the invention includes defining canonical representations for program semantics for a fast and scalable approximate comparison, as well as for a deeper and more precise semantic comparison. Accordingly, as used above and additionally herein, "deeper" refers to something being more accurate or precise. As used herein, an approximate comparison includes comparing light-weight semantic features such as tables, standard-functions, and/or data structures used, and computing a similarity measure between programs as a function of the overlap based on the light-weight semantic features. As noted, such a comparison is fast and scalable; that is, for a given program, the comparison can extract light-weight features and search an index (created using light-weight semantic features) of other known programs in a matter of a few seconds, for instance. Additionally, carrying out such a comparison may require converting the programs being compared into a comparable canonical representation by applying semantics-preserving transformations including (but not limited to) demodularization, pattern-based canonical transformations, etc. Such a comparison can require pairwise execution between two programs being compared.

Additionally, an aspect of the invention includes indexing standard code solutions based on light-weight semantics for subsequent fast and scalable searching. Further, as detailed herein, at least one embodiment of the invention includes presenting a semantic comparison to a human user to assist similarity and/or difference comprehension.

Figure 1:
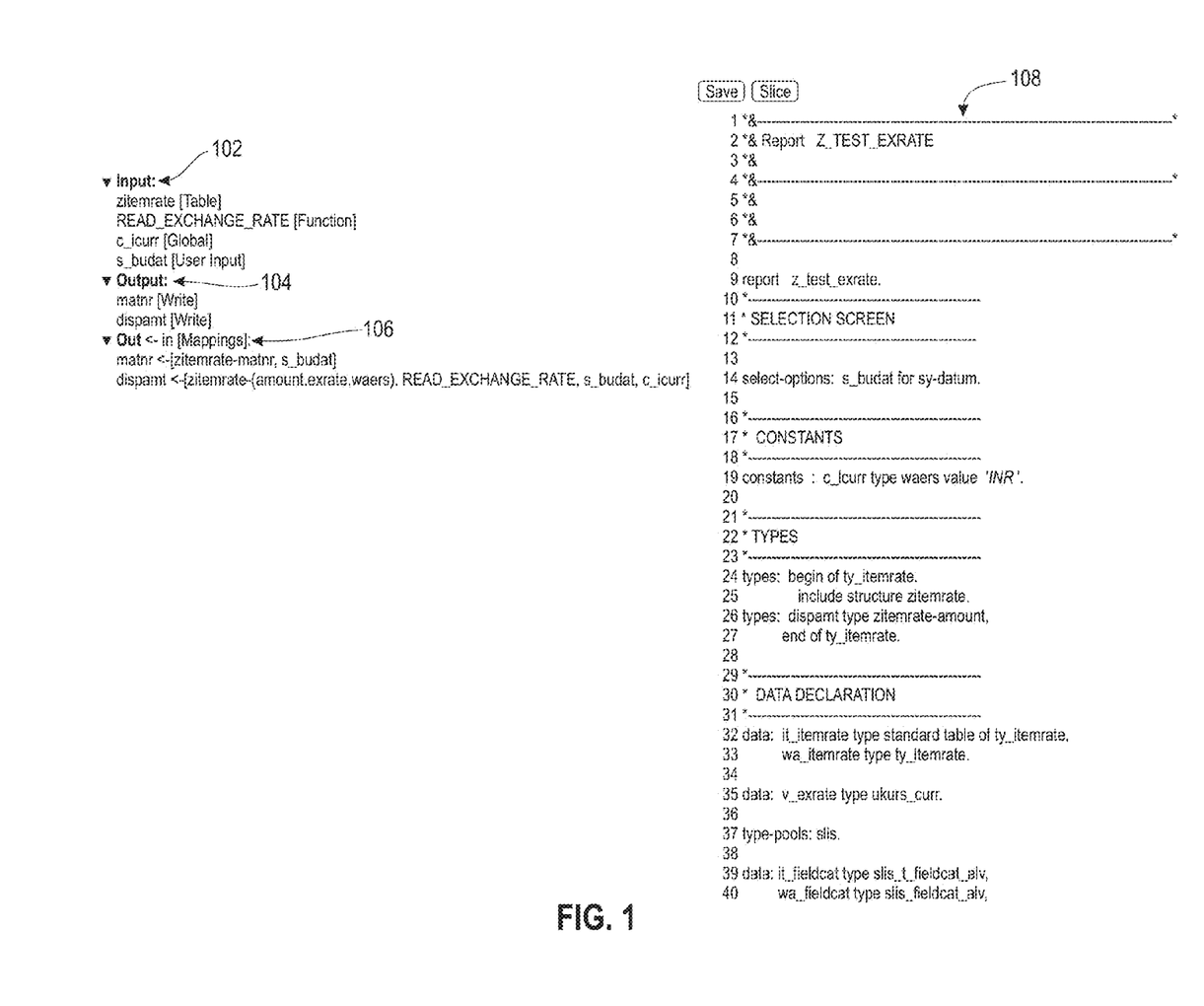
FIG. 1 is a diagram illustrating examples of inputs, outputs, and mappings, in accordance with at least one embodiment of the invention.

Accordingly, an aspect of the invention includes techniques to compare programs via incorporation of one or more features described herein. For example, at least one embodiment of the invention includes a light-weight semantics-based search for equivalent candidates. A light-weight semantic summary of a program or a software solution can be defined based on its input, output, a mapping of output to input, tables-used, external/library functions used, etc. By way merely of illustration, FIG. 1 depicts examples of inputs 102, outputs 104, and mappings 106 within an implementation 108 such as described herein and in accordance with at least one embodiment of the invention. Additionally, as noted, at least one embodiment of the invention includes creating a searchable index for programs and/or solutions based on light-weight semantic summaries, such as defined above.

Figure 2:
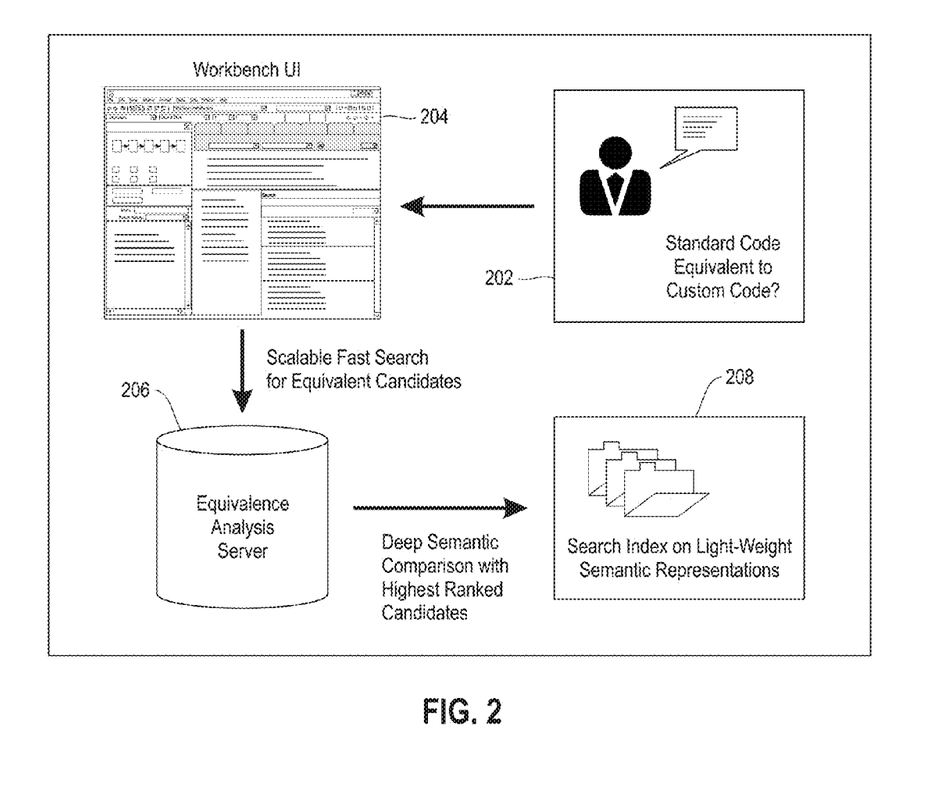
FIG. 2 is a diagram illustrating components of a scalable search for equivalent candidates using light-weight semantics, according with at least one embodiment of the invention.

FIG. 2 is a diagram illustrating components of a scalable search for equivalent candidates using light-weight semantics, according to an embodiment of the present invention. By way of illustration, identifying programs and/or solutions equivalent to a given program or solution includes generating a search query, such as depicted via component 202 in FIG. 2, based on the extracted light-weight semantic summary associated with the given program or solution, and running that query, via workbench user interface (UI) 204, on an equivalence analysis server 206, which uses a search-index based on a light-weight summary as depicted via component 208. The result of running the query can include output, as illustrated in FIG. 3, which can be used to perform a deeper semantic comparison with selected candidates.

Figure 3:
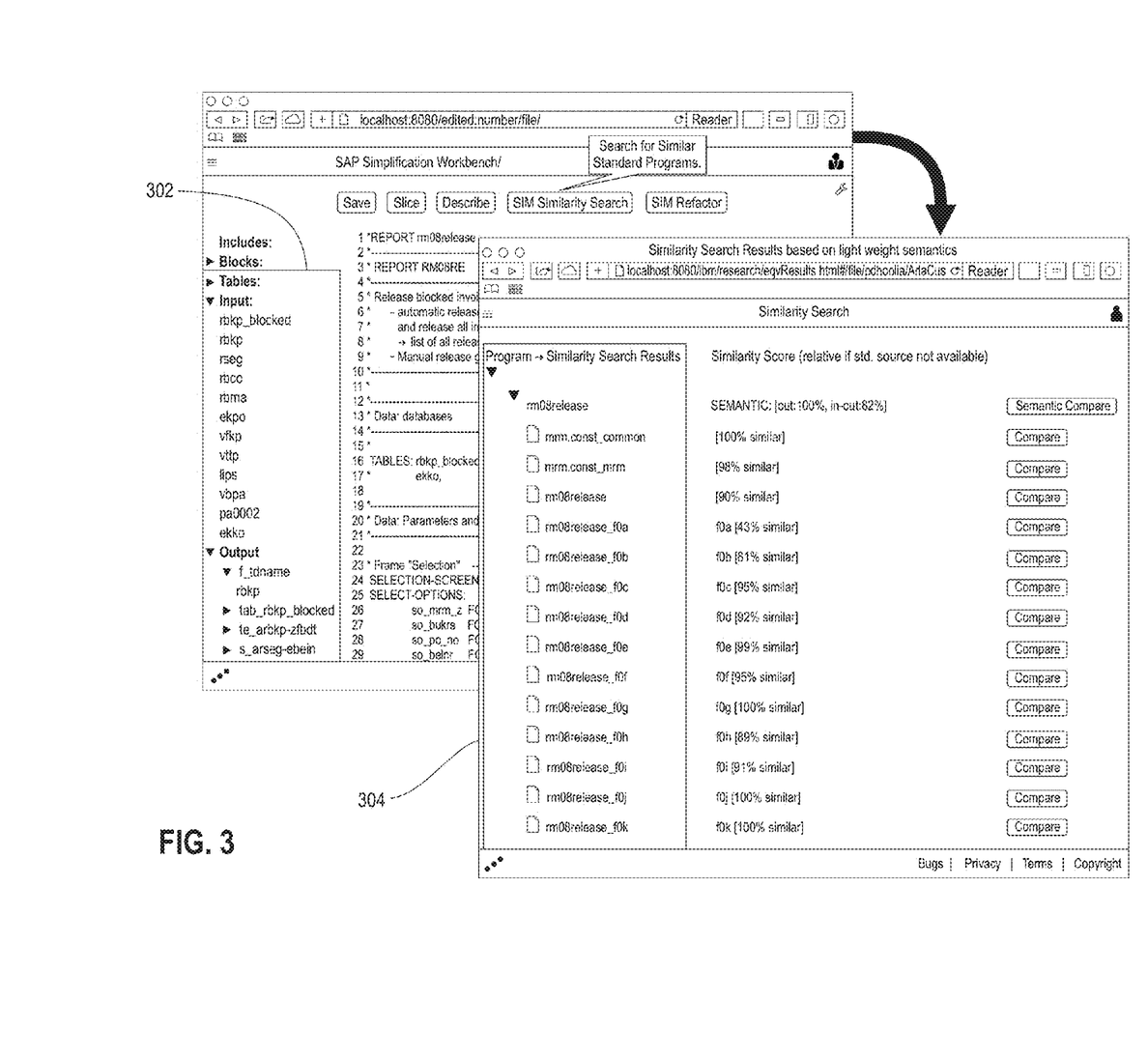
FIG. 3 is a diagram illustrating a search for programs similar to a program under consideration, in accordance with at least one embodiment of the invention.

Accordingly, FIG. 3 is a diagram illustrating a search for programs similar to a program under consideration, in accordance with an embodiment of the invention. By way of illustration, FIG. 3 depicts a structured search query 302 that is generated based on a light-weight semantic summary. Additionally, at least one embodiment of the invention includes searching with the generated query 302 on an index of standard programs and responding with and/or generating identified similar candidates and a comparison summary 304.

A deeper comparison of a given program or solution with selected equivalent candidates found during the light-weight semantics-based search can include, for example, defining patterns of equivalence. Such patterns can include, for instance, statement-level semantic equivalence, as well as higher-order programming-domain-specific patterns of computational equivalence (loop-splitting, loop-fusion, etc.). Additionally, canonical transformation operators can be defined. Such canonical transformation operators can include, for example, a de-modularization operator and/or a variable equivalence operator. At least one embodiment of the invention also includes perform refactoring of programs to transform programs and/or solutions to canonical representations guided by the patterns of equivalence and canonicalization operators.

Figure 4:
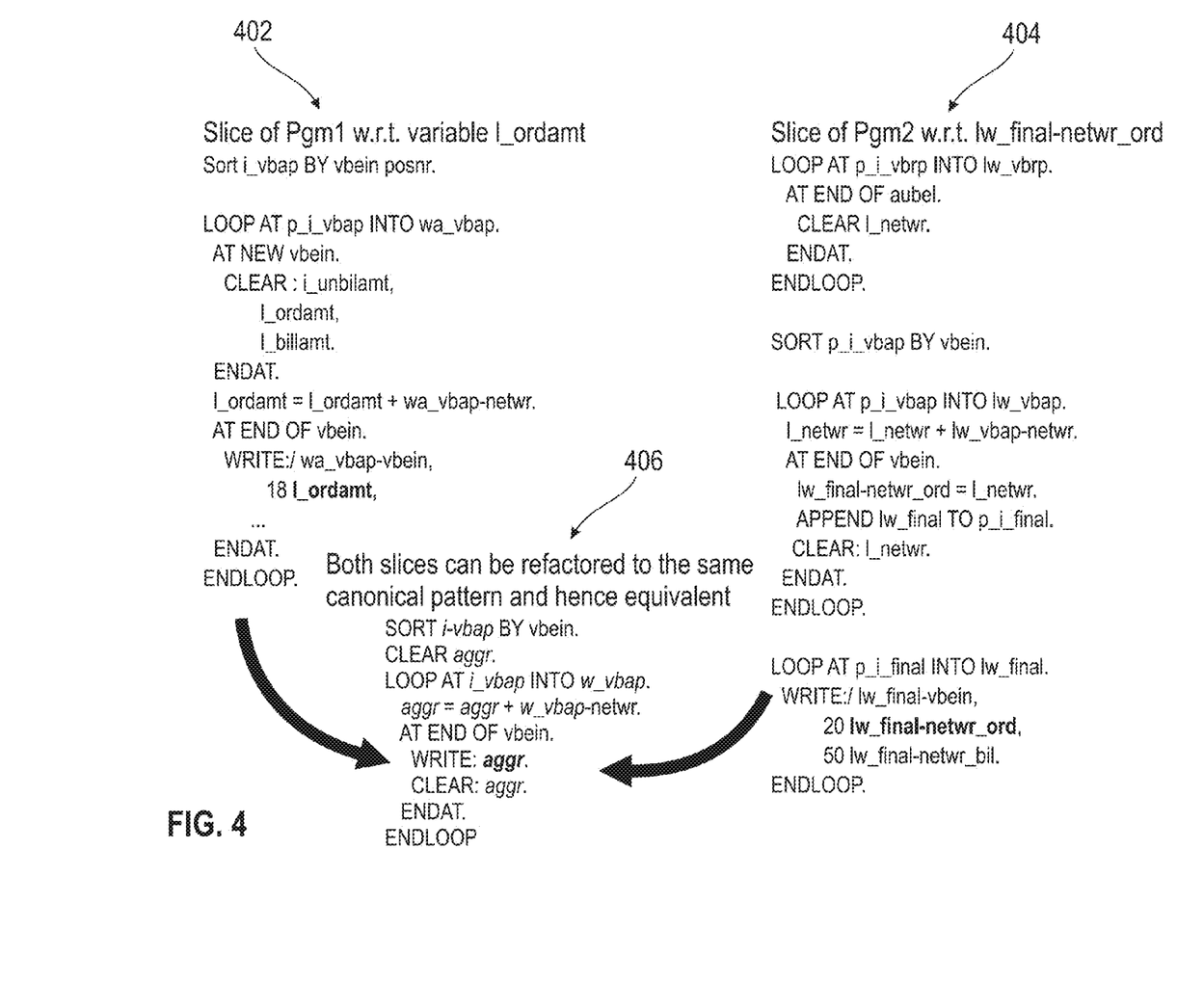
FIG. 4 is a diagram illustrating a deeper semantic comparison using full canonical representation, in accordance with at least one embodiment of the present invention.

FIG. 4 is a diagram illustrating a deeper semantic comparison using full canonical representation, in accordance with at least one embodiment of the present invention. Specifically, FIG. 4 depicts an example embodiment wherein two different programs, program 402 and program 404, are semantically equivalent with respect to how they compute "Order Amounts." The steps of deep semantic comparison in such an example as depicted in FIG. 4 include the following:

1. For output variable 1_ordamt in Pgm 1 (402), an equivalent variable lw_final-netwr_ord is identified. In one or more embodiments of the invention, this variable can be found automatically by data-slicing (or flow) analysis, which suggests that, in each program, the variable is the same data-type, and computed as a function of a standard table 'vbap''s column netwr.

2. Slices with respect to the variable are observed in both of the programs being compared (that is, program 402 and program 404) to determine if the programs comply with a pattern of computing captured in a semantic patterns database. In such an example, the semantics pattern database contains computing patterns for aggregated-value-computation in a grouped-by looped processing on a table sorted on a group of columns. Additionally, such a semantic pattern database can also contain an equivalent pattern to that in which instead of outputting the aggregated value in the same loop, the value may be written to a temporary table, and subsequently, a separate loop may be iterated over that table and the values output. Using this knowledge, at least one embodiment of the invention includes transforming the programs to a single canonical representation 406 for this computation. As slices in both programs are transformed to the same canonical representation 406, the slices with respect to this output are considered equivalent.

Further, at least one embodiment of the invention additionally includes specifying a user interface to search, preventively-search, and/or comprehend semantic similarity and/or difference. This step can include searching for equivalent code with input/output intentions as specified, and displaying a side-by-side comparison between equivalent code candidates with respect to unique and distinguished inputs/outputs, as well as slices with respect thereto. By way of example, comparative slices can be displayed in original programs as well as on refactored canonical representations.

Figure 5:
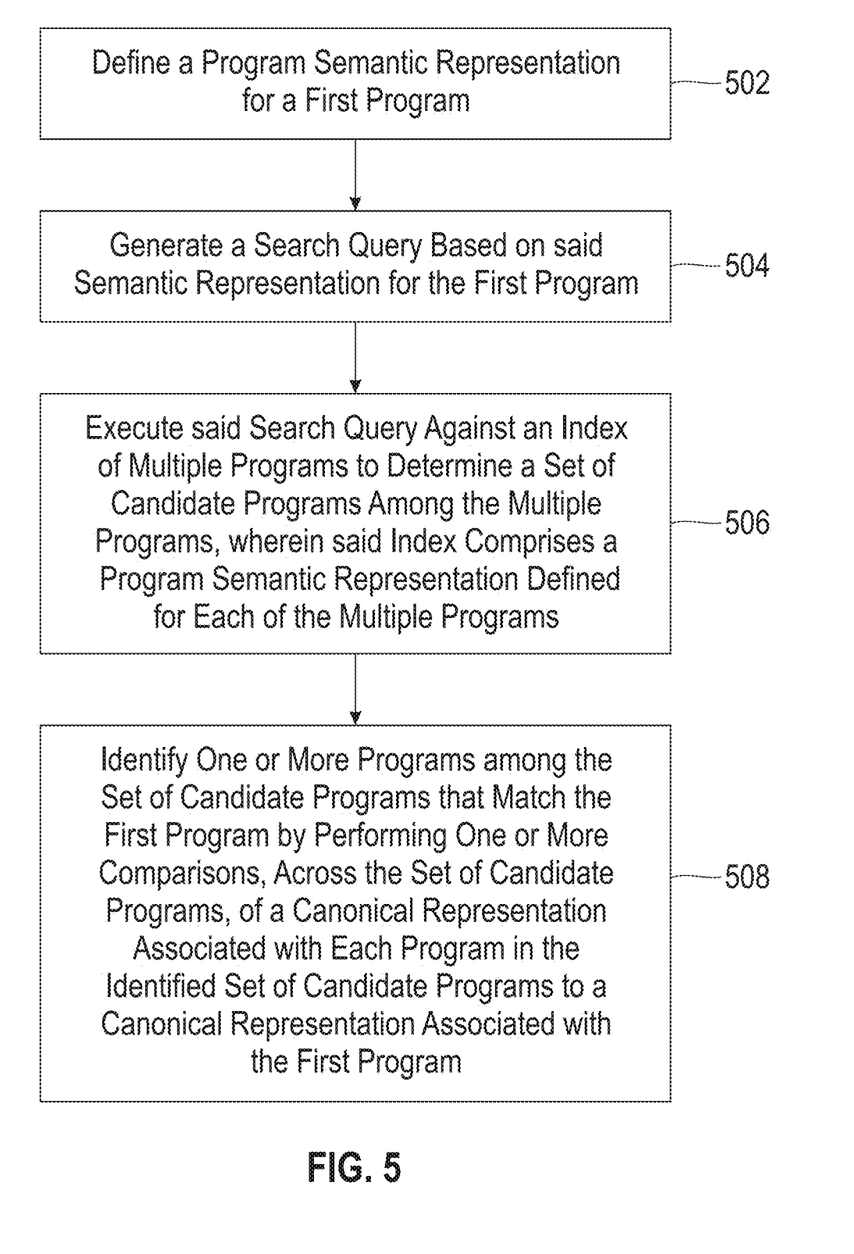
FIG. 5 is a flow diagram illustrating techniques according to an embodiment of the invention.

FIG. 5 is a flow diagram illustrating techniques according to an embodiment of the invention. Step 502 includes defining a program semantic representation for a first program. Defining can include, for example, defining the program semantic representation based on program input, program output and a mapping of program output to program input. Additionally, defining can include, for example, defining the program semantics representation for each of the multiple programs based on one or more equivalent programming patterns. Further, at least one embodiment of the invention includes indexing each of the multiple programs based on the program semantics representation defined for each of the multiple programs.

Step 504 includes generating a search query based on said semantic representation for the first program. Step 506 includes executing said search query against an index of multiple programs to determine a set of candidate programs among the multiple programs, wherein said index comprises a program semantic representation defined for each of the multiple programs.

Step 508 includes identifying one or more programs among the set of candidate programs that match the first program by performing one or more comparisons, across the set of candidate programs, of a canonical representation associated with each program in the identified set of candidate programs to a canonical representation associated with the first program. Identifying can include refactoring each program in the set of candidate programs to utilize the canonical representation associated with each program in the identified set of candidate programs.

Additionally, performing the one or more comparisons can include a comparison based on one or more equivalent programming patterns and/or a comparison based on one or more canonicalization operators. The one or more canonicalization operators can include, for example, a patterns of equivalence operator, wherein the patterns of equivalence operator comprises one or more patterns of equivalence. Such patterns of equivalence can include, for example, a pattern of statement-level-semantic-equivalence and/or a programming-domain-specific pattern of computational equivalence.

Additionally, the one or more canonicalization operators can include, for example, a de-modularization (DeMod) operator and/or a variable equivalence operator. A de-modularization operator can be implemented so as to preclude modularity interference with comparison. Also, a variable equivalence operator identifies comparable variables across the programs being compared.

As detailed herein, at least one embodiment of the invention includes techniques that include the steps of defining a program semantics abstraction for a first program and generating a search query based on said semantics abstraction for the first program. As noted above, a defining step can include defining the program semantic abstraction based on (i) program input, (ii) program output and (iii) a mapping of program output to program input. Additionally, as used herein, "abstraction" and "representation" can be used interchangeably.

Such an embodiment further includes executing said search query against an index of multiple programs to identify a pre-determined number of candidate equivalent programs from the index of multiple programs based on one or more metrics, wherein said index comprises a program semantics abstraction defined for each of the multiple programs. With respect to metrics, at least one embodiment of the invention includes selecting a top few (or predetermined number of) results as candidates for deeper comparison, taking into consideration score difference statistics. For example, if a first result's score is 50% better than a second result's score, then at least one embodiment of the invention can include ignoring everything but the first result. Another heuristic that can be implemented in one or more embodiments of the invention includes a scenario wherein if there are three or more results that are reasonably close in similarity score, then an indication is derived that there is no true similarity, as a heuristically-standard code will not itself have three or more clones of a functionality.

Such techniques as detailed above additionally include steps of classifying one or more programs among the candidate equivalent programs as matching (that is, matching the above-noted first program) by performing a comparison, across the candidate equivalent programs, of a canonical representation associated with each program in the identified set of candidate equivalent programs to a canonical representation associated with the first program, and outputting an identification of the one or more programs classified as matching (for example, to a human user).

Further, such techniques can include displaying the comparison. Displaying can include visualizing the comparison in juxtaposed code editors and generating an interactive summary of equivalence. Additionally, the interactive summary of equivalence can include (i) each common item of input and/or output, (ii) each unique item of input and/or output, and (iii) one or more associated metrics. By way of example, FIG. 6 is a diagram illustrating visualization of an example workbench, in accordance with at least one embodiment of the present invention. By way of illustration, FIG. 6 depicts an outlined box 602 that provides a summary of the similarities and differences in the inputs and/or outputs of program 604 and program 606.

Referring back to FIG. 5, in at least one embodiment of the invention, clicking on (or similarly selecting) the common/unique inputs/outputs visualizes corresponding navigable slices in each of the programs.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 7:
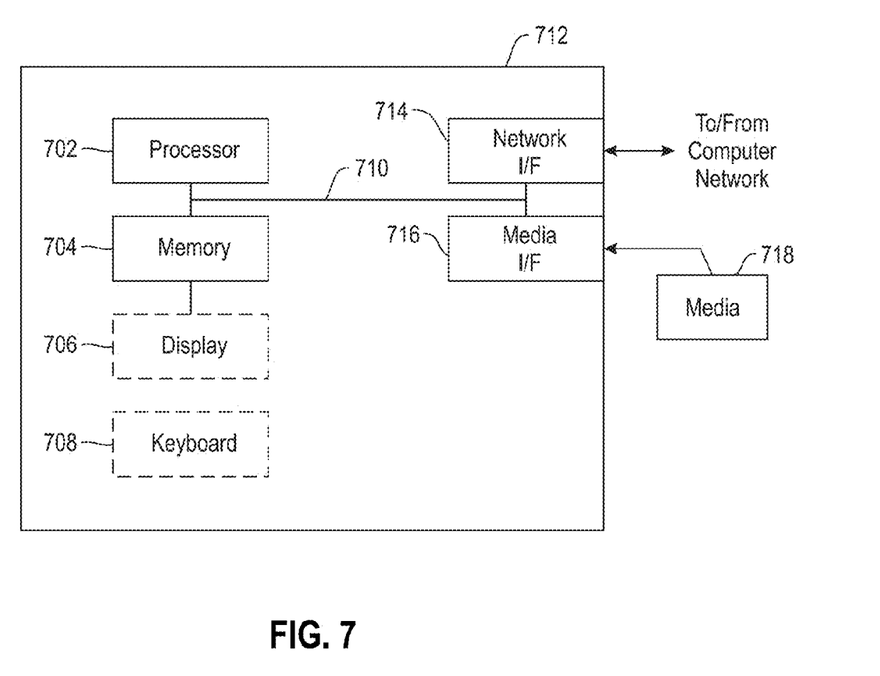
FIG. 7 is a system diagram of an exemplary computer system on which at least one embodiment of the invention can be implemented.

Additionally, an aspect of the present invention can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof. The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, defining canonical representations for program semantics for scalable approximate comparison and semantic comparison.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining program equivalence between a first program and multiple candidate programs, the method comprising steps of:

defining a program semantic representation for the first program;

generating a search query based on said program semantic representation;

executing said search query against an index of multiple programs, wherein said index comprises a program semantic representation for each of the multiple programs;

outputting a set of candidate programs, among the multiple programs, as a result of executing said search query against the index;

refactoring (i) the first program and (ii) each program in the set of candidate programs, wherein said refactoring is based on (a) one or more patterns of program equivalence and (b) one or more canonicalization operators;

outputting a canonical representation of (i) the first program and (ii) each respective program in the set of candidate programs as a result of said refactoring;

identifying one or more programs among the set of candidate programs that match the first program by performing one or more comparisons, across the set of candidate programs, of the canonical representation associated with each respective program in the identified set of candidate programs to the canonical representation associated with the first program, wherein said performing the one or more comparisons comprises:
    extracting multiple semantic features from (i) the canonical representation associated with each respective program in the identified set of candidate programs and (ii) the canonical representation associated with the first program;
    creating an index based on the extracted semantic features from the canonical representation associated with each respective program in the identified set of candidate programs;
    searching the created index using the extracted semantic features from the canonical representation associated with the first program; and
    computing similarity measures between (i) the canonical representation associated with each respective program in the identified set of candidate programs and (ii) the canonical representation associated with the first program, wherein each similarity measure comprises a function of overlap of extracted semantic features based on said searching, and wherein computing each similarity measure comprises:
        identifying a variable in a canonical representation associated with a given program in the set of candidate programs, wherein the identified variable is equivalent to an output variable in the canonical representation associated with the first program, and wherein said identifying comprises implementing data-slicing analysis; and
        analyzing slices with respect to (i) the identified variable in the canonical representation associated with a given program in the set of candidate programs and (ii) the output variable in the canonical representation associated with the first program to determining whether the given program and the first program both comply with a given pattern of computing; and
    outputting the one or more identified programs that match the first program to at least one user;
    wherein the steps are carried out by at least one processor coupled to a memory.

2. The method of claim 1, wherein said defining comprises defining the program semantic representation based on (i) program input, (ii) program output and (iii) a mapping of program output to program input.

3. The method of claim 1, wherein said one or more comparisons comprises a comparison based on one or more equivalent programming patterns.

4. The method of claim 1, wherein said one or more comparisons comprise a comparison based on one or more canonicalization operators.

5. The method of claim 4, wherein said one or more canonicalization operators comprise a pattern of equivalence operator.

6. The method of claim 5, wherein said patterns of equivalence operator comprises one or more patterns of equivalence.

7. The method of claim 6, wherein said one or more patterns of equivalence comprise a pattern of statement-level semantic equivalence.

8. The method of claim 6, wherein said one or more patterns of equivalence comprise a programming-domain-specific pattern of computational equivalence.

9. The method of claim 4, wherein said one or more canonicalization operators comprise a de-modularization operator.

10. The method of claim 4, wherein said one or more canonicalization operators comprise a variable equivalence operator.

11. A computer program product for determining program equivalence between a first program and multiple candidate programs, the computer program product comprising a non-transitory computer readable storage medium having program instructions embodied therewith, the program instructions executable by a computing device to cause the computing device to:
    define a program semantic representation for the first program;
    generate a search query based on said program semantic representation;
    execute said search query against an index of multiple programs, wherein said index comprises a program semantic representation for each of the multiple programs;
    output a set of candidate programs, among the multiple programs, as a result of executing said search query against the index;
    refactor (i) the first program and (ii) each program in the set of candidate programs, wherein said refactoring is based on (a) one or more patterns of program equivalence and (b) one or more canonicalization operators;
    output a canonical representation of (i) the first program and (ii) each respective program in the set of candidate programs as a result of said refactoring;
    identify one or more programs among the set of candidate programs that match the first program by performing one or more comparisons, across the set of candidate programs, of the canonical representation associated with each respective program in the identified set of candidate programs to the canonical representation associated with the first program, wherein said performing the one or more comparisons comprises:
        extracting multiple semantic features from (i) the canonical representation associated with each respective program in the identified set of candidate programs and (ii) the canonical representation associated with the first program;
        creating an index based on the extracted semantic features from the canonical representation associated with each respective program in the identified set of candidate programs;
        searching the created index using the extracted semantic features from the canonical representation associated with the first program; and
        computing similarity measures between (i) the canonical representation associated with each respective program in the identified set of candidate programs and (ii) the canonical representation associated with the first program, wherein each similarity measure comprises a function of overlap of extracted semantic features based on said searching, and wherein computing each similarity measure comprises:
            identifying a variable in a canonical representation associated with a given program in the set of candidate programs, wherein the identified variable is equivalent to an output variable in the canonical representation associated with the first program, and wherein said identifying comprises implementing data-slicing analysis; and
            analyzing slices with respect to (i) the identified variable in the canonical representation associated with a given program in the set of candidate programs and (ii) the output variable in the canonical representation associated with the first program to determining whether the given program and the first program both comply with a given pattern of computing; and outputting the one or more identified programs that match the first program to at least one user.

12. A system for determining program equivalence between a first program and multiple candidate programs, comprising:

a memory; and at least one processor coupled to the memory and configured for:

defining a program semantic representation for the first program;

generating a search query based on said program semantic representation;

executing said search query against an index of multiple programs, wherein said index comprises a program semantic representation for each of the multiple programs;

outputting a set of candidate programs, among the multiple programs, as a result of executing said search query against the index;

refactoring (i) the first program and (ii) each program in the set of candidate programs, wherein said refactoring is based on (a) one or more patterns of program equivalence and (b) one or more canonicalization operators;

outputting a canonical representation of (i) the first program and (ii) each respective program in the set of candidate programs as a result of said refactoring;

identifying one or more programs among the set of candidate programs that match the first program by performing one or more comparisons, across the set of candidate programs, of the canonical representation associated with each respective program in the identified set of candidate programs to the canonical representation associated with the first program, wherein said performing the one or more comparisons comprises:

extracting multiple semantic features from (i) the canonical representation associated with each respective program in the identified set of candidate programs and (ii) the canonical representation associated with the first program;

creating an index based on the extracted semantic features from the canonical representation associated with each respective program in the identified set of candidate programs;

searching the created index using the extracted semantic features from the canonical representation associated with the first program; and computing similarity measures between (i) the canonical representation associated with each respective program in the identified set of candidate programs and (ii) the canonical representation associated with the first program, wherein each similarity measure comprises a function of overlap of extracted semantic features based on said searching, and wherein computing each similarity measure comprises:

identifying a variable in a canonical representation associated with a given program in the set of candidate programs, wherein the identified variable is equivalent to an output variable in the canonical representation associated with the first program, and wherein said identifying comprises implementing data-slicing analysis; and analyzing slices with respect to (i) the identified variable in the canonical representation associated with a given program in the set of candidate programs and (ii) the output variable in the canonical representation associated with the first program to determining whether the given program and the first program both comply with a given pattern of computing; and outputting the one or more identified programs that match the first program to at least one user.

13. A method for determining program equivalence between a first program and multiple candidate programs, the method comprising steps of:

defining a program semantic abstraction for the first program;

generating a search query based on said program semantic abstraction for the first program;

executing said search query against an index of multiple programs, wherein said index comprises a program semantics abstraction defined for each of the multiple programs;

outputting a pre-determined number of candidate equivalent programs, from the index of multiple programs, as a result of executing said search query against the index, wherein the pre-determined number of candidate equivalent programs is based on one or more metrics;

refactoring (i) the first program and (ii) each program in the pre-determined number of candidate equivalent programs, wherein said refactoring is based on (a) one or more patterns of program equivalence and (b) one or more canonicalization operators;

outputting a canonical representation of (i) the first program and (ii) each respective program in the pre-determined number of candidate equivalent programs as a result of said refactoring;

classifying one or more programs among the pre-determined number of candidate equivalent programs as matching the first program by performing a comparison, across the pre-determined number of candidate equivalent programs, of the canonical representation associated with each respective program in the pre-determined number of candidate equivalent programs to the canonical representation associated with the first program, wherein said performing the comparison comprises:

extracting multiple semantic features from (i) the canonical representation associated with each respective program in the candidate equivalent programs and (ii) the canonical representation associated with the first program;

creating an index based on the extracted semantic features from the canonical representation associated with each respective program in the candidate equivalent programs;

searching the created index using the extracted semantic features from the canonical representation associated with the first program; and computing similarity measures between (i) the canonical representation associated with each respective program in the candidate equivalent programs and (ii) the canonical representation associated with the first program, wherein each similarity measure comprises a function of overlap of extracted semantic features based on said searching, and wherein computing each similarity measure comprises:
- identifying a variable in a canonical representation associated with a given program in the set of candidate programs, wherein the identified variable is equivalent to an output variable in the canonical representation associated with the first program, and wherein said identifying comprises implementing data-slicing analysis; and
- analyzing slices with respect to (i) the identified variable in the canonical representation associated with a given program in the set of candidate programs and (ii) the output variable in the canonical representation associated with the first program to determining whether the given program and the first program both comply with a given pattern of computing; and outputting an identification of the one or more programs classified as matching to at least one user; wherein the steps are carried out by at least one processor coupled to a memory.

14. The method of claim 13, wherein said defining comprises defining the program semantic abstraction based on (i) program input, (ii) program output and (iii) a mapping of program output to program input.

15. The method of claim 13, wherein said outputting comprises outputting the identification of the one or more programs classified as matching to a human user.

16. The method of claim 13, comprising:
displaying the comparison.

17. The method of claim 16, wherein said displaying comprises (i) visualizing the comparison in juxtaposed code editors and (ii) generating an interactive summary of equivalence.

18. The method of claim 17, wherein said interactive summary of equivalence comprises (i) each common item of input and/or output, (ii) each unique item of input and/or output, and (iii) one or more associated metrics.

* * * * *